United States Patent
Messer et al.

(10) Patent No.: US 10,013,695 B2
(45) Date of Patent: Jul. 3, 2018

(54) METHODS, APPARATUS AND ARTICLES-OF-MANUFACTURE FOR SECONDARY REFERRAL TRACKING ON A PUBLIC-ACCESS COMPUTER NETWORK

(75) Inventors: Stephen D. Messer, Mount Kisco, NY (US); Horace J. Meng, New York, NY (US); Cheryl Ho, San Francisco, CA (US)

(73) Assignee: RAKUTEN MARKETING LLC, New York, NY (US)

( * ) Notice: Subject to any disclaimer, the term of this patent is extended or adjusted under 35 U.S.C. 154(b) by 1592 days.

(21) Appl. No.: 09/771,135

(22) Filed: Jan. 27, 2001

(65) Prior Publication Data

US 2002/0111856 A1      Aug. 15, 2002

(51) Int. Cl.
    *G06Q 30/02*      (2012.01)
(52) U.S. Cl.
    CPC ......... *G06Q 30/02* (2013.01); *G06Q 30/0214* (2013.01)
(58) Field of Classification Search
    CPC .................................. G06Q 30/0207–30/0277
    USPC ........................................................ 705/14
    See application file for complete search history.

(56) References Cited

U.S. PATENT DOCUMENTS

| | | |
|---|---|---|
| 5,319,542 A | 6/1994 | King, Jr. et al. |
| 5,537,314 A | 7/1996 | Kanter |
| 5,590,197 A | 12/1996 | Chen et al. |
| 5,692,206 A | 11/1997 | Shirley et al. |
| 5,708,780 A | 1/1998 | Levergood et al. |
| 5,710,884 A | 1/1998 | Dedrick |
| 5,712,979 A | 1/1998 | Graber et al. |
| 5,715,314 A | 2/1998 | Payne et al. |
| 5,715,315 A | 2/1998 | Handelman |
| 5,717,860 A | 2/1998 | Graber et al. |
| 5,724,424 A | 3/1998 | Gifford |
| 5,745,681 A | 4/1998 | Levine et al. |
| 5,796,952 A | 8/1998 | Davis et al. |
| 5,812,769 A * | 9/1998 | Graber et al. ................. 709/228 |
| 5,819,285 A | 10/1998 | Damico et al. |
| 5,848,396 A | 12/1998 | Gerace |
| 5,855,008 A | 12/1998 | Goldhaber et al. |
| 5,873,076 A | 2/1999 | Barr et al. |
| 5,937,392 A | 8/1999 | Alberts |
| 5,948,016 A | 9/1999 | Jang |
| 5,948,061 A | 9/1999 | Merriman et al. |
| 5,963,915 A * | 10/1999 | Kirsch ............................ 705/26 |
| 5,991,735 A | 11/1999 | Gerace |
| 5,991,740 A | 11/1999 | Messer |

(Continued)

FOREIGN PATENT DOCUMENTS

| | | |
|---|---|---|
| KR | 2000-0007010 | 2/2000 |
| WO | WO 01/37158 | 5/2001 |

OTHER PUBLICATIONS http://www.pcwebopedia.com/TERM/P/parse.htm (2 pages).*

(Continued)

*Primary Examiner* — David J Stoltenberg
(74) *Attorney, Agent, or Firm* — Troutman Sanders LLP

(57) ABSTRACT

Improved methods, systems and articles-of-manufacture permit the tracking of secondary referral sources in network-based e-commerce environments, thereby enabling advantageous commission-sharing arrangements between primary and secondary referral sources.

11 Claims, 8 Drawing Sheets

(56) References Cited

U.S. PATENT DOCUMENTS

| | | | |
|---|---|---|---|
| 5,999,914 A | | 12/1999 | Blinn |
| 6,006,197 A | | 12/1999 | d'Eon et al. |
| 6,016,504 A | | 1/2000 | Arnold et al. |
| 6,029,141 A | * | 2/2000 | Bezos et al. ............... 705/27 |
| 6,035,281 A | * | 3/2000 | Crosskey et al. .......... 705/14.69 |
| 6,041,309 A | | 3/2000 | Laor |
| 6,047,327 A | | 4/2000 | Tso et al. |
| 6,055,513 A | * | 4/2000 | Katz et al. ............... 705/26 |
| 6,061,660 A | * | 5/2000 | Eggleston et al. ............... 705/14 |
| 6,141,666 A | | 10/2000 | Tobin |
| 6,173,271 B1 | | 1/2001 | Goodman et al. |
| 6,226,618 B1 | | 5/2001 | Down et al. |
| 6,240,455 B1 | | 5/2001 | Kamasaka |
| 6,289,318 B1 | * | 9/2001 | Barber ............... 705/14.16 |
| 6,334,111 B1 | * | 12/2001 | Carrott ............... 705/14 |
| 6,629,135 B1 | * | 9/2003 | Ross et al. ............... 709/218 |
| 6,804,660 B2 | * | 10/2004 | Landau et al. ............... 705/14 |
| 6,826,594 B1 | * | 11/2004 | Pettersen ............... 709/203 |
| 7,032,168 B1 | * | 4/2006 | Gerace et al. ............... 715/205 |
| 7,249,056 B1 | * | 7/2007 | Crouthamel ............ G06Q 30/06 705/26.41 |
| 7,505,913 B2 | | 3/2009 | Tobin |
| 2001/0020231 A1 | * | 9/2001 | Perri, III ............... G06Q 30/02 705/14.16 |
| 2001/0034646 A1 | * | 10/2001 | Hoyt et al. ............... 705/14 |
| 2001/0037205 A1 | * | 11/2001 | Joao ............... G06Q 20/10 705/1.1 |
| 2002/0042739 A1 | | 4/2002 | Srinivasan |

OTHER PUBLICATIONS http:// en.wikipedia.org/wiki/Parsing, parsing (4 pages).*
http:// en.wikipedia.org/wiki/Formal_grammar (6 pages).*
Fixing Executive Compensation Excesses:The board members who decide a CEO's pay have a fundamental conflict of interest, and shareholders need to have more of a say, by Edward E. Lawler III , BusinessWeek, Viewpoint Feb. 5, 2009, http://www.businessweek.com/print/managing/content/feb2009/ca2009025_072667.htm, downloaded Feb. 16, 2009.*
Excerpt of Hoyt, U.S. Appl. No. 60/178,260, filed Jan. 25, 2000, on Public Pair (6 pages attached).*
Definition of server, http://web.archive.org/web/20090522200720/http://foldoc.org/server.*
Selected document from internet.com Web site entitled "DoubleClick, 24/7 Media, L90 Settle Patent Suits" by Pamela Parker, downloaded and printed Jan. 18, 2001 (3 pages).
Search results on Internet related patents.
Abstract of U.S. Pat. No. 5,537,314.
John A. Quelch, "The Internet and International Marketing," Sloan Management Review, v37, n. 3, pp. 60-75, Spring 1996.
Selected documents from books.com Web site describing Book Stack's Unlimited's Links Partner Program, downloaded and printed Jun. 20, 1997 and Jun. 23, 1997 (8 pages).
Selected document from Incognito Cafe Web site describing several on-line Bookstore Links, undated (5 pages).
Full text article from Dialog search titled "Booksite launches version 3.0 of the popular electronic commerce web site", Business Wire, Feb. 23, 1996, p. 02231111 (2 pages).
Full text article from Dialog search titled amazon.com Introduces 'amazon.com Associates'—A New Model for Internet-Based Commerce, Business Wire, Jul. 18, 1996, p. 07181040 (3 pages).
Text journal article for Dialog search titled "Can mixing cookies; with online marketing be a recipe for heartburn?" by Foster, Ed, InfoWorld, v18n30 pp. 54, Jul. 22, 1996 (2 pages).
Full text journal article from Dialog search titled "Real-Time Travel Info Available Online", Newsbytes News Network, p. N/A, Jan. 17, 1995 (2 pages).
Abstract from Dialog search titled "Online growth 'virtually' untapped; PC vendors taking more advantage of booming sales . . . " by Harrington, Mark, Computer Retail Week, v4, n64, p. 160 (1), Jun. 6, 1994 (1 page).
Full text titled "GroupLens: An Open Architecture for Collaborative Filtering of Netnews" by Paul Resnick et al., from Proceedings of ACM 1994 Conference on Computer Supported Cooperative Work, Chapel Hill, NC: pp. 175-186 (18 pages).
Full text titled "Fab: Content-Based, Collaborative Recommendation" by Marko Balabanovic et al., Communications of the ACM Mar. 1997, vol. 40, No. 3 (8 pages).
Krick, J.. "A cookie for thoughts: cookies help webmasters harness user habits," Computer Shopper, v17, n7, p. 610(1).
Full text article from Dialog search titled "Networking and the rise of electronic commerce: The challenge for public policy," Business Economic, v30n4, Oct. 1995, p. 01097255 (10 pages).
Bruce Judson, "Luring Advertisers Prospects to the Web", Advertising Age, p. 16, Aug. 7, 1995.

* cited by examiner

METHODS, APPARATUS AND ARTICLES-OF-MANUFACTURE FOR SECONDARY REFERRAL TRACKING ON A PUBLIC-ACCESS COMPUTER NETWORK

FIELD OF THE INVENTION

The present invention relates generally to the field of computer network-based electronic commerce ("e-commerce"). More particularly, the invention relates to methods, systems and articles-of-manufacture for tracking and compensating commercial referral sources in network-based e-commerce environments, such as the Internet or the worldwide web ("www"). Still more particularly, the invention relates to methods, apparatus and articles-of-manufacture for tracking and/or compensating secondary referrals such as situations in which a web site refers a user to first e-commerce site (the "primary referral"), then the first e-commerce site refers the user to a second e-commerce site (a "secondary referral"), and the second e-commerce site refers the user to a third e-commerce site (another "secondary referral"), etc.—in a public-access computer network, and for creating incentives for e-commerce merchants (or others) to make such secondary referrals.

BACKGROUND OF THE INVENTION

Referral tracking systems are well-known and widely-used on the Internet. These systems originated with Internet advertisers, who desired methods to demonstrate the effectiveness of their advertisements in directing users to a customer's web site. By keeping records of users who utilize a given advertisement link to reach a customer's web site, advertisers could demonstrate to their customers that their advertisements were responsible for referring a specific number of users (each a potential purchaser) the customers' web sites. While this sort of early referral tracking provided some quantitative measure of an advertisement's effectiveness, it was less than ideal. In particular, it did not provide any measure of the actual revenue attributable to a given advertisement (or other referral), but only the number of hits or referrals generated.

A significant advance over the early number-of-hits-based tracking approaches is described U.S. Pat. No. 5,991,740, entitled DATA PROCESSING SYSTEM FOR INTEGRATED TRACKING AND MANAGEMENT OF COMMERCE RELATED ACTIVITIES ON A PUBLIC ACCESS NETWORK, to Messer, which patent is incorporated herein by reference. The '740 patent discloses a network-based system in which a user visiting a web site can utilize a specially-formatted navigational link, provided by the web site, to reach an e-commerce merchant. Although transparent to the user, the navigational link, when engaged by the user, initiates a process whereby information related to any purchase(s) the user ultimately makes at the e-commerce merchant's site is stored. This stored information proves extremely useful, since it provides a quantitative answer to question: "How effective was each referral in generating revenue for the merchant"? It also enables a wide class of advantageous, win-win revenue-sharing arrangements, whereby merchants may offer to compensate entities (commonly referred to as "affiliates") who refer customers based, for example, on a percentage of the referred customers' purchases. Various improvement(s) and/or refinement(s) the '740 invention is/are disclosed in U.S. patent application Ser. No. 09/558,356, entitled TRANSACTION TRACKING, MANAGING, ASSESSMENT AND AUDITING DATA PROCESSING SYSTEM AND NETWORK, and Ser. No. 09/098,860, entitled TRANSACTION TRACKING AND ASSESSMENT DATA PROCESSING SYSTEM AND NETWORK, both of which applications are also incorporated herein by reference.

A similar, but significantly less flexible, approach to such referral tracking is also disclosed in U.S. Pat. No. 6,016,504, entitled METHOD AND SYSTEM FOR TRACKING THE PURCHASE OF A PRODUCT AND SERVICES OVER THE INTERNET, and U.S. Pat. No. 6,029,141, entitled INTERNET-BASED CUSTOMER REFERRAL SYSTEM, both incorporated herein by reference. These patents teach a merchant-based approach, in which a software module installed on the merchant's server tracks affiliate referrals and compensates affiliates whose referrals result in purchases.

While the above-incorporated sources disclose workable systems and teach various components, elements and techniques useful in connection with the invention described herein, such systems still suffer from various deficiencies that limit their overall effectiveness in providing an optimally efficient referral-based e-commerce marketplace. In particular, known techniques do not provide any means for motivating, tracking and compensating secondary referrals. Consider for example, a situation in which an affiliate refers a customer to gourmet food merchant, where the referred customer purchases some steaks, for which the affiliate receives a referral commission. In this situation, there is good probability that the customer may still be interested in purchasing additional related good, such as red wine or steak knives, that are not stocked by the gourmet food merchant.

Accordingly, it would be highly desirable to have a method, system and article-of-manufacture through which an e-commerce merchant could make secondary referrals to vendors of related goods. It would also be highly desirable to have a method, system and article-of-manufacture through which both primary and secondary referral sources are rewarded, or compensated, when a secondary referral results in a purchase. Still further, it would be highly desirable to have a method, system and article-of-manufacture which enables tracking of such secondary referrals and compensation using a flexible and extensible architecture. These, as well as other, needs are addressed by the present invention.

SUMMARY OF THE INVENTION

In light of the above, one general object of the invention relates to improved methods, systems and articles-of-manufacture for motivating, tracking and compensating referral sources to, and among, a plurality of e-commerce merchants.

Another object of the invention relates to improved methods, apparatus and articles-of-manufacture for use in connection with network-based e-commerce environments to enable compensation, or additional compensation, of primary referral sources when resulting secondary referrals lead to additional purchases, thereby increasing the potential reward associated with primary referrals, and encouraging primary referrals to merchants who aggressively exploit cross-selling opportunities available through use of secondary referrals.

Still another object of the invention relates to improved methods, apparatus and articles-of-manufacture for use in connection with network-based e-commerce environments to enable tracking of, and compensation for, secondary referrals from e-commerce merchants to other e-commerce merchants, thereby motivating e-commerce merchants to aggressively exploit cross-selling opportunities, and encouraging other e-commerce merchants to enroll in merchant groups or networks that support secondary referral tracking and compensation.

Yet another object of the invention relates to improved methods, apparatus and articles-of-manufacture for use in connection with network-based e-commerce environments to enable sharing of commissions resulting from secondary referrals in accordance with a variety of preselected commission allocation schemes, thus providing a flexible environment in which to select, or optimize, commission allocation schemes for maximum profit, or to meet other goals (e.g., maximum primary referrals, maximum secondary referrals, etc.).

These, as well as other objects and advantages of the present invention, will become apparent in light of the description and claims below.

Now, generally speaking, and without intending to be limiting, one aspect of the invention relates to a method of tracking selected referrals in a network-based e-commerce environment, including a plurality of network-connected e-commerce sites accessible by a plurality of network-connected users, the method comprising: enrolling at least two e-commerce sites in a merchant network; providing a first navigational link that allows network-connected users to reach a first one of the e-commerce sites that have enrolled in the merchant network; providing a second navigational link that allows network-connected users to navigate from the first one of the e-commerce sites to a second one of the e-commerce sites that have enrolled in the merchant network; and compensating entities associated with the first and second navigational links when a network-connected user utilizes the first navigational link to reach the first e-commerce site, utilizes the second navigational link to reach the second e-commerce site and completes a commercial transaction at the second e-commerce site. Compensating entities associated with the first and second navigational links may involve splitting a referral commission associated with the commercial transaction between the entities associated with the first and second navigational links, assigning equal portions of a referral commission associated with the commercial transaction to each of the entities associated with the first and second navigational links, assigning a majority portion of a referral commission associated with the commercial transaction to the entity associated with the first navigational link and assigning a minority portion of the referral commission to the entity associated with the second navigational link, or assigning a minority portion of a referral commission associated with the commercial transaction to the entity associated with the first navigational link and assigning a majority portion of the referral commission to the entity associated with the second navigational link. The method may further involve compensating only an entity associated with the first navigational link when a network-connected user utilizes the first navigational link to reach the first e-commerce site and completes a commercial transaction at the first e-commerce site and/or compensating only an entity associated with the second navigational link when a network-connected user utilizes the second navigational link to reach the second e-commerce site and completes a commercial transaction at the second e-commerce site. The method may also involve providing a third navigational link that allows network-connected users to navigate from the second one of the e-commerce sites to a third one of the e-commerce sites that have enrolled in the merchant network and compensating entities associated with the first, second and third navigational links when a network-connected user utilizes the first navigational link to reach the first e-commerce site, utilizes the second navigational link to reach the second e-commerce site, utilizes the third navigational link to reach the third e-commerce site and completes a commercial transaction at the third e-commerce site. Compensating entities associated with the first, second and third navigational links may involve assigning equal portions of a referral commission associated with the commercial transaction completed at the third e-commerce site to each of the entities associated with the first, second and third navigational links, assigning a majority portion of a referral commission associated with the commercial transaction completed at the third e-commerce site to the entities associated with the second and/or third navigational links, or assigning a majority portion of a referral commission associated with the commercial transaction completed at the third e-commerce site to the entity associated with the third navigational link.

Again, generally speaking, and without intending to be limiting, another aspect of the invention relates to a method of compensating sources who refer network-connected users to, and among, a group of e-commerce merchants, the method comprising: providing a plurality of network-accessible primary referral links configured to direct network-connected users from a source outside the group of e-commerce merchants to selected ones of the e-commerce merchants in the group of e-commerce merchants; providing a plurality of network-accessible secondary referral links configured to direct network-connected users from e-commerce merchants in the group of e-commerce merchants to other e-commerce merchants in the group of e-commerce merchants; compensating a primary referral source in response to completion of an e-commerce transaction at one of the e-commerce merchants in the group of e-commerce merchants, where the user who completed the transaction was referred to the e-commerce merchant by a referral link provided by the primary referral source; and, compensating primary and secondary referral sources in response to completion of an e-commerce transaction at one of the e-commerce merchants in the group of e-commerce merchants, where the user who completed the transaction was referred to the secondary referral source by a referral link provided by the primary referral source, and the user was referred to the e-commerce merchant by a referral link provided by the secondary referral source. Compensating primary and secondary referral sources may involve assigning equal shares of a commission associated with the completion of the e-commerce transaction to the primary and secondary referral sources, assigning a majority portion of a commission associated with the completion of the e-commerce transaction to the primary referral source and assigning a minority portion of the commission to the secondary referral source, or assigning a majority portion of a commission associated with the completion of the e-commerce transaction to the secondary referral source and assigning a minority portion of the commission to the primary referral source.

Again, generally speaking, and without intending to be limiting, another aspect of the invention relates to a method of tracking commissions earned by primary referrals to, and secondary referrals among, a group of e-commerce merchants, the method comprising: providing a plurality of network-accessible primary referral links configured to direct network-connected users from a source outside the group of e-commerce merchants to selected ones of the e-commerce merchants in the group of e-commerce merchants, each of the primary referral links including a primary referral source identifier that identifies the source of the primary referral link; providing a plurality of network-accessible secondary referral links configured to direct network-connected users from e-commerce merchants in the group of e-commerce merchants to other e-commerce merchants in the group of e-commerce merchants, each of the secondary referral links including a secondary referral source identifier that identifies the source of the secondary referral link; and, in response to a network-connected user's engagement of a secondary referral link to navigate from a first e-commerce merchant in the group of e-commerce merchants to second e-commerce merchant in the group of e-commerce merchants, storing primary and secondary source identifiers associated with any primary and secondary referral links utilized by the user to reach the first e-commerce merchant. Storing primary and secondary source identifiers associated with any primary and secondary referral links utilized by the user to reach the first e-commerce merchant may involve embedding primary and secondary source identifiers associated with any primary and secondary referral links utilized by the user to reach the first e-commerce merchant in a navigational link utilized to direct the user to the second e-commerce merchant, directing the user from the first e-commerce merchant to the second e-commerce merchant through a clearinghouse server and storing, at the clearinghouse server, primary and secondary source identifiers associated with any primary and secondary referral links utilized by the user to reach the first e-commerce merchant, and/or sending a message to a clearinghouse server containing the primary and secondary source identifiers associated with any primary and secondary referral links utilized by the user to reach the first e-commerce merchant.

Again, generally speaking, and without intending to be limiting, another aspect of the invention relates to a method for permitting an e-commerce merchant, in a group of e-commerce merchants, to earn commissions by referring customers to other merchant(s) in the group of e-commerce merchants, the method comprising: permitting a user to select product(s) and/or service(s) for purchase at the e-commerce merchant's site; in response to the user's selection(s) of product(s) and/or service(s), referring the user to another e-commerce merchant in the group of e-commerce merchants; in response to the user's purchase of product(s) and/or service(s) from the another e-commerce merchant, selectively assigning a commission associated with the purchase as follows: all of the commission to the e-commerce merchant who referred the user to the another e-commerce merchant, if the e-commerce merchant would not owe commissions to a any referring entity(ies) for purchases made by the user from the e-commerce merchant, or if the e-commerce merchant would owe commissions to one or more referring entity(ies) for purchases made by the user from the e-commerce merchant, part of the commission to the e-commerce merchant, and part of the commission to one or more of the one or more referring entity(ies). Assigning part of the commission associated with the purchase to the e-commerce merchant and part of the commission to one or more of the referring entity(ies) may involve assigning a majority of the commission to the e-commerce merchant, or assigning a majority of the commission to one or more of the referring entity(ies).

Again, generally speaking, and without intending to be limiting, another aspect of the invention relates to a network-based e-commerce environment, comprising: a network-accessible merchant enrollment processing module, optionally configured to enroll e-commerce merchants in a merchant network through an automated, on-line process; a network-accessible affiliate enrollment processing module, optionally configured to enroll affiliates through an automated, on-line process, thereby enabling enrolled affiliates to provide primary referral links to enrolled e-commerce merchants; and a commission processing module, configured to: assign compensation to an affiliate in response to (i) a network-connected user's use of a primary referral link provided by the affiliate to reach an enrolled e-commerce merchant and (ii) the user's completion of a transaction with the e-commerce merchant, and assign compensation to both an affiliate and an enrolled e-commerce merchant in response to (i) a network-connected user's use of a primary referral link provided by the affiliate to reach the enrolled e-commerce merchant, (ii) the user's use of a secondary referral link provided by the e-commerce merchant to reach another enrolled e-commerce merchant and (iii) the user's completion of a transaction with the another e-commerce merchant. The merchant enrollment processing module may include a merchant identification module that assigns a unique merchant identifier to each newly enrolled merchant and/or a merchant software stub installation module that provides tracking software for installation at enrolled e-commerce merchants. The affiliate enrollment processing module may include an affiliate identification module that assigns a unique affiliate identifier to each newly enrolled affiliate. The primary referral links may each include an affiliate identifier. The commission processing module may be hosted by a network-connected clearinghouse server, separate from the enrolled e-commerce merchants. The enrollment processing modules may also hosted by the clearinghouse server. The commission processing module may be further configured to assign compensation to both the affiliate and the enrolled e-commerce merchant by splitting between the affiliate and enrolled merchant a commission equal to that which the affiliate would receive for referring the user directly to the another e-commerce merchant. Such commission splitting may assign equal shares of the split commission to the affiliate and the enrolled e-commerce merchant, assign a majority share of the split commission to the affiliate and a minority share of the split commission to the enrolled e-commerce merchant, or assign a minority share of the split commission to the affiliate and a majority share of the split commission to the enrolled e-commerce merchant.

Again, generally speaking, and without intending to be limiting, another aspect of the invention relates to a network-based system for compensating sources who refer network-connected users to, and among, a group of e-commerce merchants, the system comprising: a plurality of network-accessible primary referral links configured to direct network-connected users from a source outside the group of e-commerce merchants to selected ones of the e-commerce merchants in the group of e-commerce merchants; a plurality of network-accessible secondary referral links configured to direct network-connected users from e-commerce merchants in the group of e-commerce merchants to other e-commerce merchants in the group of e-commerce merchants; means (of any sort whatsoever, such as an embedded software module in one or more of the e-commerce servers, or a separate software module hosted by, for example, a clearinghouse server) for compensating a primary referral source in response to completion of an e-commerce transaction at one of the e-commerce merchants in the group of e-commerce merchants, where the user who completed the transaction was referred to the e-commerce merchant by a referral link provided by the primary referral source; and means (of any sort whatsoever, such as an embedded software module in one or more of the e-commerce servers, or a separate software module hosted by, for example, a clearinghouse server) for compensating primary and secondary referral sources in response to completion of an e-commerce transaction at one of the e-commerce merchants in the group of e-commerce merchants, where the user who completed the transaction was referred to the secondary referral source by a referral provided by the primary referral source, and the user was referred to the e-commerce merchant by a referral link provided by the secondary referral source. The means for compensating primary and secondary referral sources may include means for assigning equal shares of a commission associated with the completion of the e-commerce transaction to the primary and secondary referral sources, means for assigning a majority portion of a commission associated with the completion of the e-commerce transaction to the primary referral source and assigning a minority portion of the commission to the secondary referral source, or means for assigning a majority portion of a commission associated with the completion of the e-commerce transaction to the secondary referral source and assigning a minority portion of the commission to the primary referral source.

Again, generally speaking, and without intending to be limiting, another aspect of the invention relates to a system for tracking commissions earned by primary referrals to, and secondary referrals among, a group of e-commerce merchants, the method comprising: a plurality of network-accessible primary referral links configured to direct network-connected users from a source outside the group of e-commerce merchants to selected ones of the e-commerce merchants in the group of e-commerce merchants, each of the primary referral links including a primary referral source identifier that identifies the source of the primary referral link; a plurality of network-accessible secondary referral links configured to direct network-connected users from e-commerce merchants in the group of e-commerce merchants to other e-commerce merchants in the group of e-commerce merchants, each of the secondary referral links including a secondary referral source identifier that identifies the source of the secondary referral link; and a secondary referral processing module, responsive to a network-connected user's engagement of a secondary referral link to navigate from a first e-commerce merchant in the group of e-commerce merchants to second e-commerce merchant in the group of e-commerce merchants, and configured to store primary and secondary source identifiers associated with any primary and secondary referral links utilized by the user to reach the first e-commerce merchant. The secondary referral processing module may embed primary and secondary source identifiers associated with any primary and secondary referral links utilized by the user to reach the first e-commerce merchant in a navigational link utilized to direct the user to the second e-commerce merchant, direct the user from the first e-commerce merchant to the second e-commerce merchant through a clearinghouse server and store, at the clearinghouse server, primary and secondary source identifiers associated with any primary and secondary referral links utilized by the user to reach the first e-commerce merchant, and/or send a message to a clearinghouse server containing the primary and secondary source identifiers associated with any primary and secondary referral links utilized by the user to reach the first e-commerce merchant.

Again, generally speaking, and without intending to be limiting, another aspect of the invention relates to a system for permitting an e-commerce merchant, in a group of e-commerce merchants, to earn commissions by referring customers to other merchant(s) in the group of e-commerce merchants, the method comprising: a catalog processing module that allows a user to select product(s) and/or service(s) for purchase at the e-commerce merchant's site; a secondary referral module, responsive to the user's selection(s) of product(s) and/or service(s), and configured to refer the user to another e-commerce merchant in the group of e-commerce merchants; and a commission processing module, responsive to the user's purchase of product(s) and/or service(s) from the another e-commerce merchant, and configured to selectively assign a commission associated with the purchase as follows: all of the commission to the e-commerce merchant who referred the user to the another e-commerce merchant, if the e-commerce merchant would not owe commissions to a any referring entity(ies) for purchases made by the user from the e-commerce merchant, or, if the e-commerce merchant would owe commissions to one or more referring entity(ies) for purchases made by the user from the e-commerce merchant, part of the commission to the e-commerce merchant, and part of the commission to one or more of the one or more referring entity(ies). Assigning part of the commission associated with the purchase to the e-commerce merchant and part of the commission to one or more of the referring entity(ies) may involve assigning a majority of the commission to the e-commerce merchant, or assigning a majority of the commission to one or more of the referring entity(ies).

Again, generally speaking, and without intending to be limiting, another aspect of the invention relates to articles-of-manufacture for use in a network-based e-commerce environment which includes a merchant network of at least two network-connected e-commerce merchants, the articles-of-manufacture comprising computer-readable media containing instructions which, when executed, cause one or more network-connected computers to: provide a first navigational link that allows network-connected users to reach a first one of the e-commerce sites in the merchant network; provide a second navigational link that allows network-connected users to navigate from the first one of the e-commerce sites to a second one of the e-commerce sites in the merchant network; and compensate entities associated with the first and second navigational links when a network-connected user utilizes the first navigational link to reach the first e-commerce site, utilizes the second navigational link to reach the second e-commerce site and completes a commercial transaction at the second e-commerce site.

Again, generally speaking, and without intending to be limiting, another aspect of the invention relates to articles-of-manufacture for use in a network-based e-commerce environment which includes a group of at least two network-connected e-commerce merchants, the articles-of-manufacture comprising computer-readable media containing instructions which, when executed, cause one or more network-connected computers to: provide a plurality of network-accessible primary referral links configured to direct network-connected users from a source outside the group of e-commerce merchants to selected ones of the e-commerce merchants in the group of e-commerce merchants, each of the primary referral links including a primary referral source identifier that identifies the source of the primary referral link; provide a plurality of network-accessible secondary referral links configured to direct network-connected users from e-commerce merchants in the group of e-commerce merchants to other e-commerce merchants in the group of e-commerce merchants, each of the secondary referral links including a secondary referral source identifier that identifies the source of the secondary referral link; and, in response to a network-connected user's engagement of a secondary referral link to navigate from a first e-commerce merchant in the group of e-commerce merchants to a second e-commerce merchant in the group of e-commerce merchants, storing primary and secondary source identifiers associated with any primary and secondary referral links utilized by the user to reach the first e-commerce merchant.

Again, generally speaking, and without intending to be limiting, another aspect of the invention relates to articles-of-manufacture for use in a network-based e-commerce environment which includes a group of at least two network-connected e-commerce merchants, the articles-of-manufacture comprising computer-readable media containing instructions which, when executed, cause one or more network-connected computers to: provide a plurality of network-accessible primary referral links configured to direct network-connected users from a source outside the group of e-commerce merchants to selected ones of the e-commerce merchants in the group of e-commerce merchants; provide a plurality of network-accessible secondary referral links configured to direct network-connected users from e-commerce merchants in the group of e-commerce merchants to other e-commerce merchants in the group of e-commerce merchants; compensate a primary referral source in response to completion of an e-commerce transaction at one of the e-commerce merchants in the group of e-commerce merchants, where the user who completed the transaction was referred to the e-commerce merchant by a referral link provided by the primary referral source; and compensate primary and secondary referral sources in response to completion of an e-commerce transaction at one of the e-commerce merchants in the group of e-commerce merchants, where the user who completed the transaction was referred to the secondary referral source by a referral provided by the primary referral source, and the user was referred to the e-commerce merchant by a referral link provided by the secondary referral source.

Additional methods, apparatus, and articles-of-manufacture in accordance with the invention may utilize "cookies" (or other data stored by, or associated with, a network-connected computer user) as a principal or supplemental (e.g., in combination with other techniques) means for storing and/or managing referral tracking data, such as that associated with the identities of primary and/or secondary referral sources.

Still further aspects of the invention relate to alternative combinations, subcombinations or supplemental combinations of the various elements, features and aspects of the illustrative methods, systems and articles-of-manufacture described above, consistent with, or in furtherance of, the objects, advantages and spirit of the instant invention.

BRIEF DESCRIPTION OF THE FIGURES

Various aspects, features and advantages of the instant invention are depicted in the accompanying set figures, which is intended to be exemplary, rather than limiting, and in which.

DESCRIPTION OF THE ILLUSTRATIVE EMBODIMENTS

Figure 1:
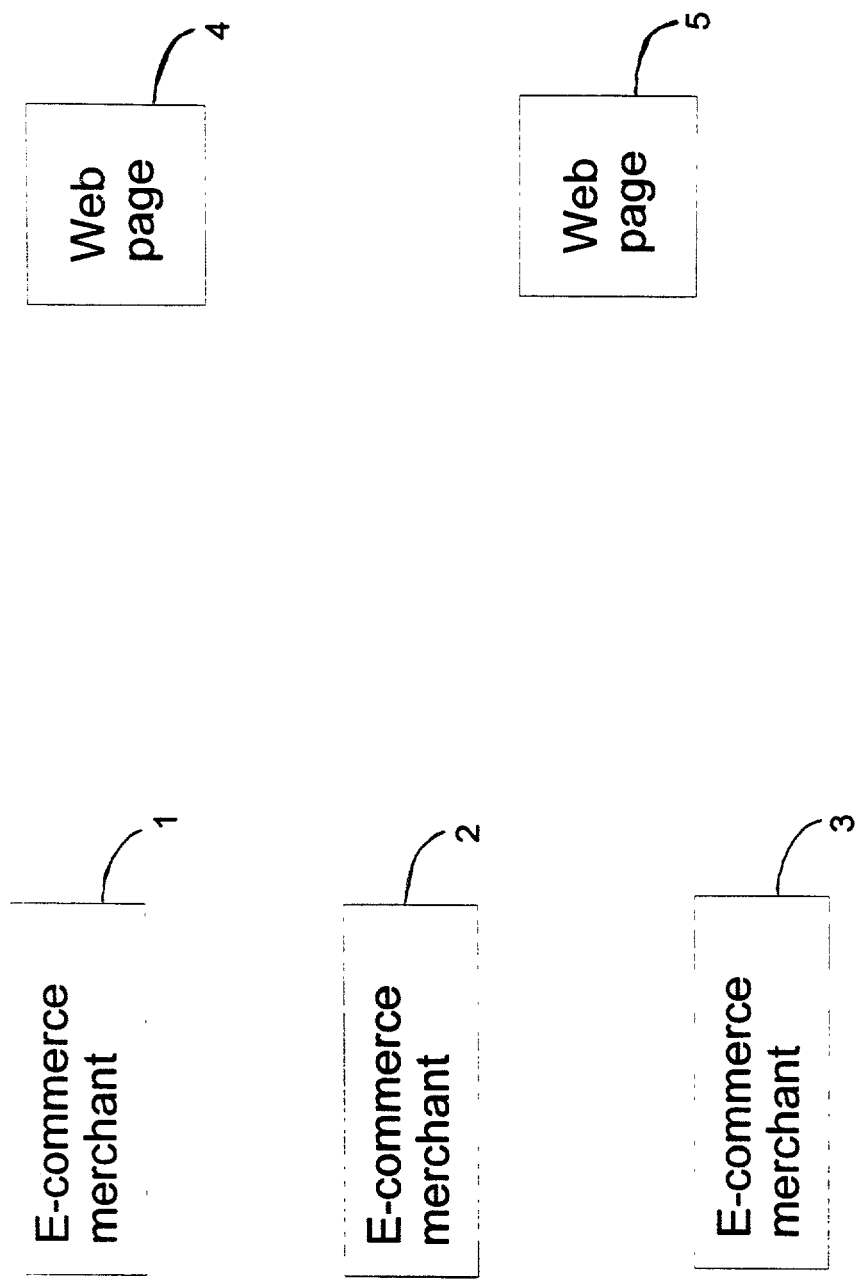
FIG. 1 depicts an exemplary network-based prior-art e-commerce environment.

Various aspects and advantages of the invention will now be described, with reference to FIGS. 1-8, in which like numbers designate like elements/actions. Referring first to FIG. 1, a prior art e-commerce environment includes a plurality of e-commerce merchants 1-3 and other network objects (shown, illustratively, as web pages 4-5), all accessible via a public-access computer network (not shown).

Figure 2:
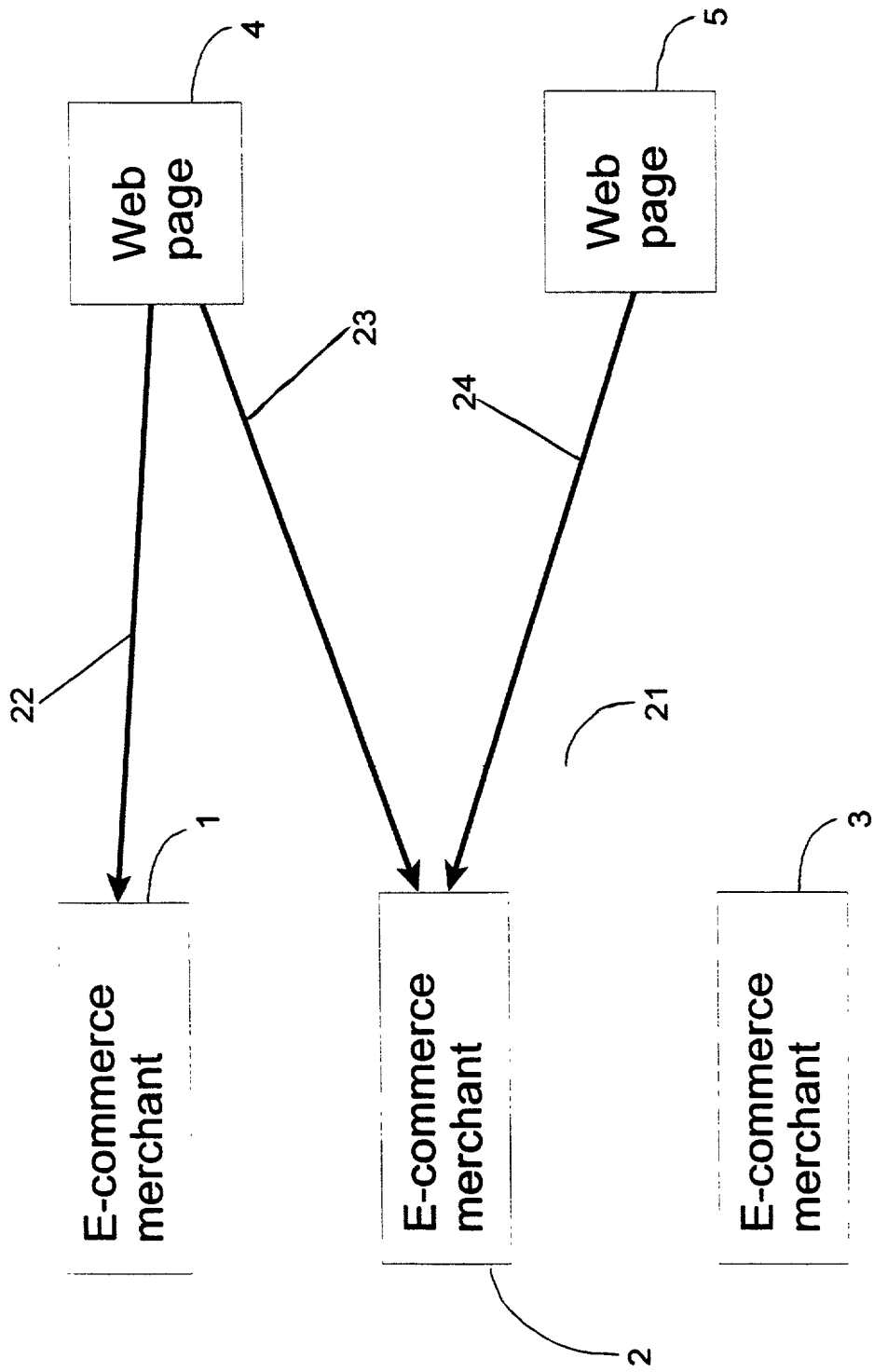
FIG. 2 depicts an exemplary network-based prior-art e-commerce environment, including a plurality of primary referral links.

Referring now to FIG. 2, e-commerce merchants 1-2 are now part of a group 21 of e-commerce merchants. Merchant 3 is not a part of group 21. A plurality of primary referral links 22-24 provide a means for web sites 4-5 to refer potential customers to the e-commerce merchants in group 21. Using prior-art techniques, various known systems, methods and/or articles-of-manufacture can be employed to compensate referral sources (e.g., web sites 4 or 5) when a referred user completes a transaction with a merchant in group 21.

Figure 3:
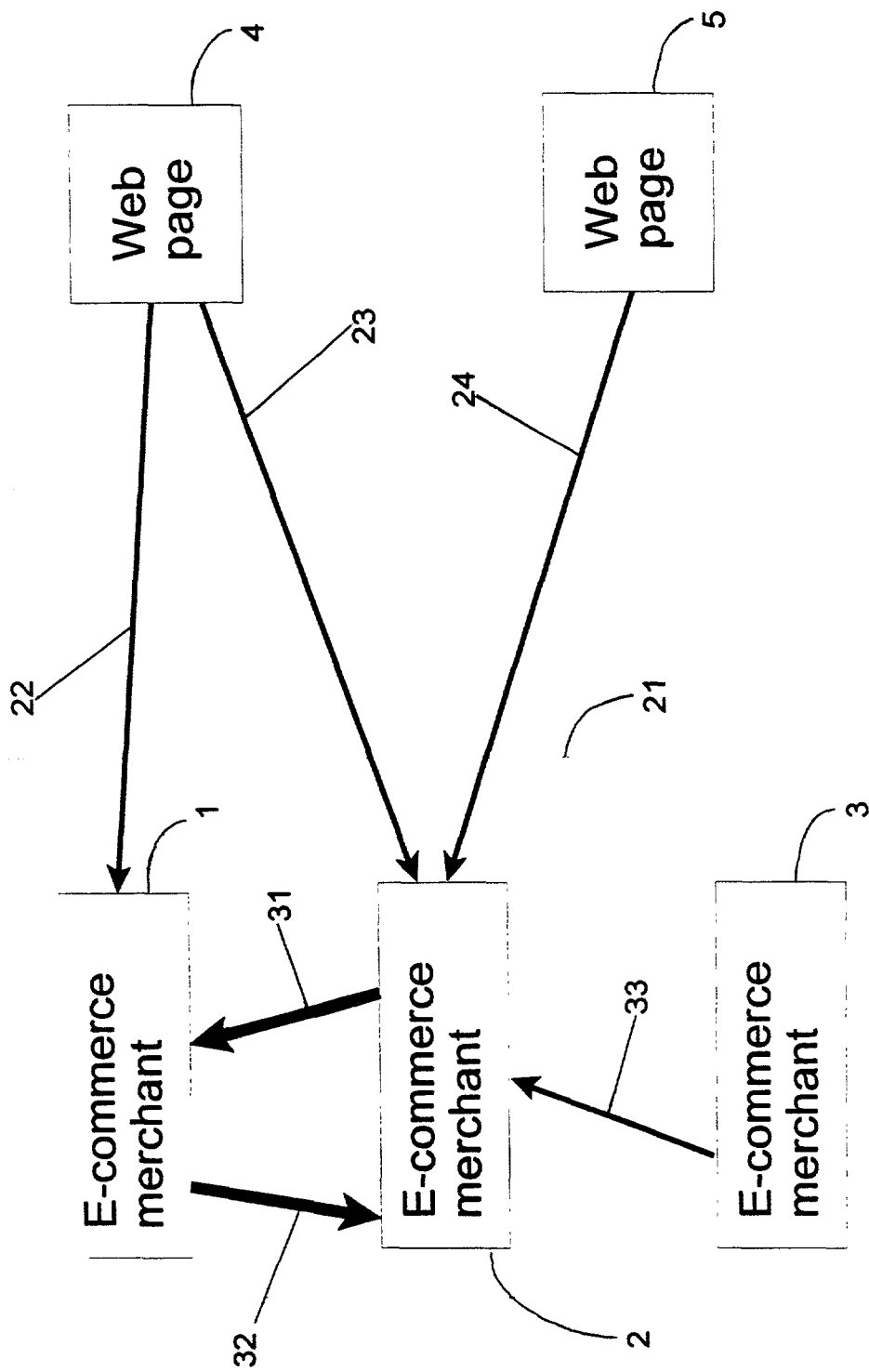
FIG. 3 depicts an exemplary network-based e-commerce environment in accordance with the invention, including a plurality of primary referral links and secondary referral links.

Referring now to FIG. 3, an illustrative e-commerce environment includes at least two e-commerce merchants 1-2 in a group 21 of affiliated or related merchants, one or more non-affiliated or related merchant(s) 3, and a plurality of network-accessible web pages 4-5. Web pages 4-5 illustratively provide a plurality of primary referral links 22-24 to the merchants in group 21. E commerce merchant 3 also provides an a primary referral link 33 to merchant 2 in group 21.

Still referring to FIG. 3, a plurality of secondary referral links 31-32 provide secondary referrals from merchants within group 21 to other merchants within group 21. Thus, a user may be referred from web page 5 to e-commerce merchant 2 for steaks (using primary referral link 5), then to e-commerce merchant 1 for wine (using secondary referral link 31), and so on. It should be noted that, in the scenario just described, nothing prevents e-commerce merchant 1 from referring the referred customer back to e-commerce merchant 2, using secondary referral link 32.

Figure 4:
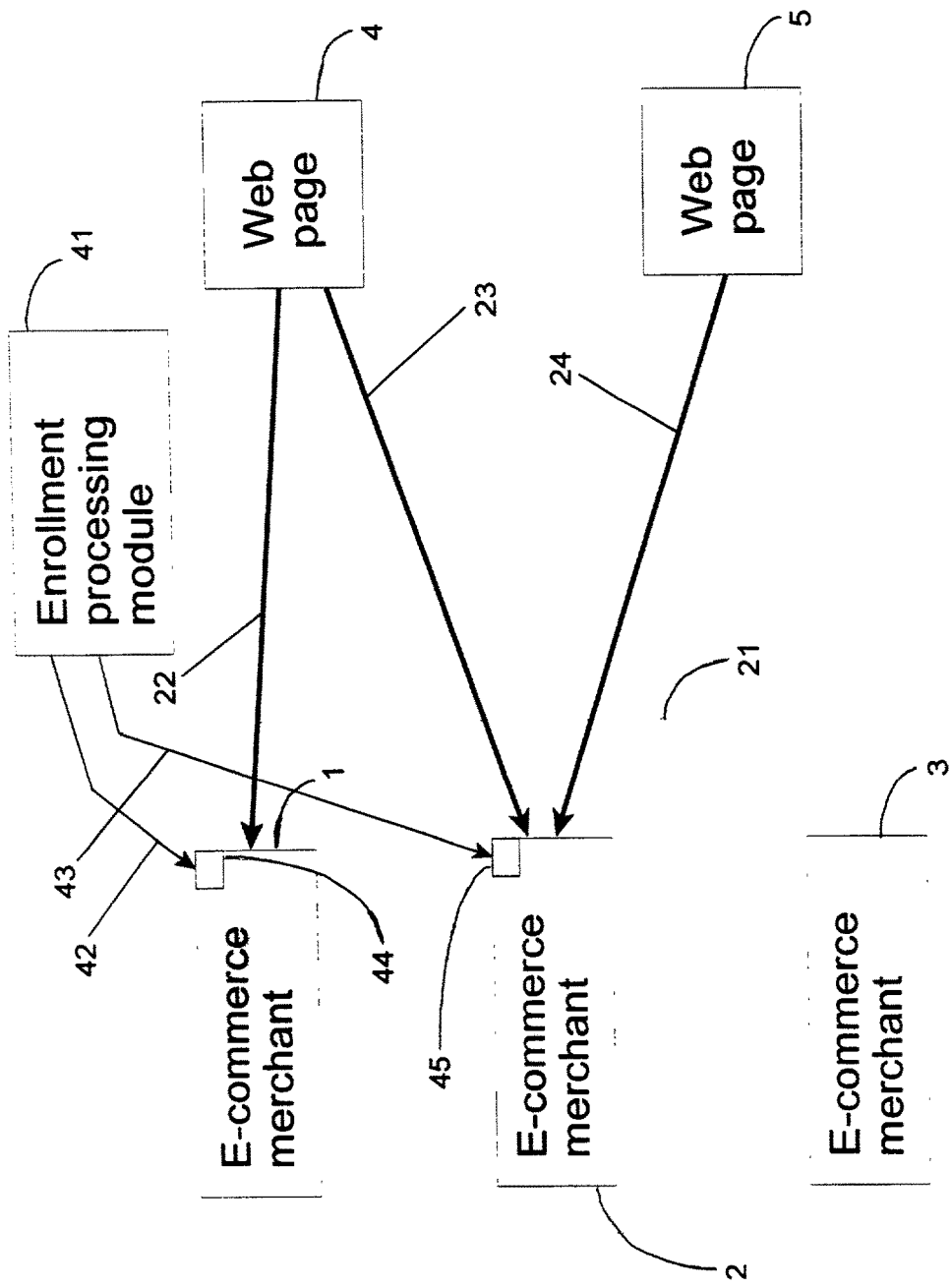
FIG. 4 depicts an exemplary network-based e-commerce environment, including an enrollment processing module.

Referring now to FIG. 4, a network-connected enrolment processing module 41 is employed to enroll merchants in group 21. Enrolment processing module 41 may operate via a fully-automated, on-line process, or through a semi-automated process. In the semi-automated process, the merchant (and potential group 21 member) may provide information to enrolment processing module 41 in electronic form, but must await some manual action, such as review by a customer service representative. Enrolment processing module 41 may be advantageously used to download 42-43 and/or install merchant stub software modules 44-45 at e-commerce merchants 1-2 enrolled in group 21. Such merchant stub software modules are preferably configured to assist in the tracking of referrals and/or the detection of commission-generating events, such as completed transactions.

Figure 5:
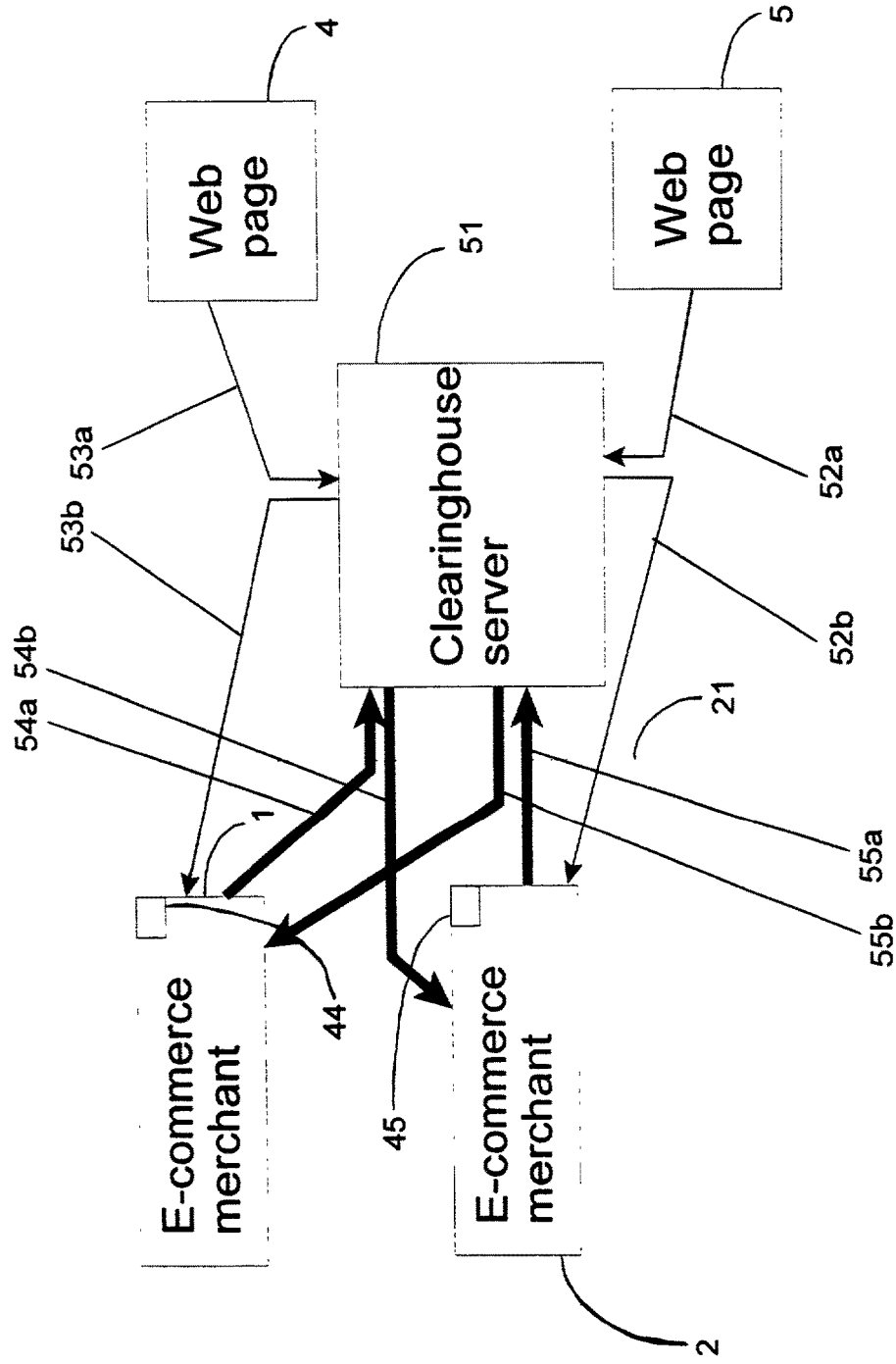
FIG. 5 depicts an exemplary network-based e-commerce environment in accordance the invention, wherein primary and secondary referrals are directed through a clearinghouse server.

Referring now to FIG. 5, a network-connected clearinghouse server 51 is used to route referrals (primary and/or secondary) between source and destination. Accordingly, a primary referral link 52*a-b* from web page 5 to e-commerce merchant 2 is illustratively comprised of two segments: a first segment 52*a* links from web page 5 to clearinghouse server 51, and a second segment 52*b* links from clearinghouse server 51 to e-commerce merchant 2. Similarly, an illustrative secondary referral link 55*a-b* from e-commerce merchant 2 to e-commerce merchant 1 is comprised of two segments: a first segment 55*a* from e-commerce merchant 2 to clearinghouse server 51, and a second segment 55*b* from clearinghouse server 51 to e-commerce merchant 1. Clearinghouse server 51 preferably operates transparently to the user, such that there is no perceptible delay as a referral link traverses through clearinghouse server 51 on the way to its ultimate destination. By routing referrals through clearinghouse server 51, it is possible to maintain records (in clearinghouse server 51) of who referred who to whom, and when such referrals happened. Such information may then be used to determine commissions to be paid to the referral source(s).

Figure 6:
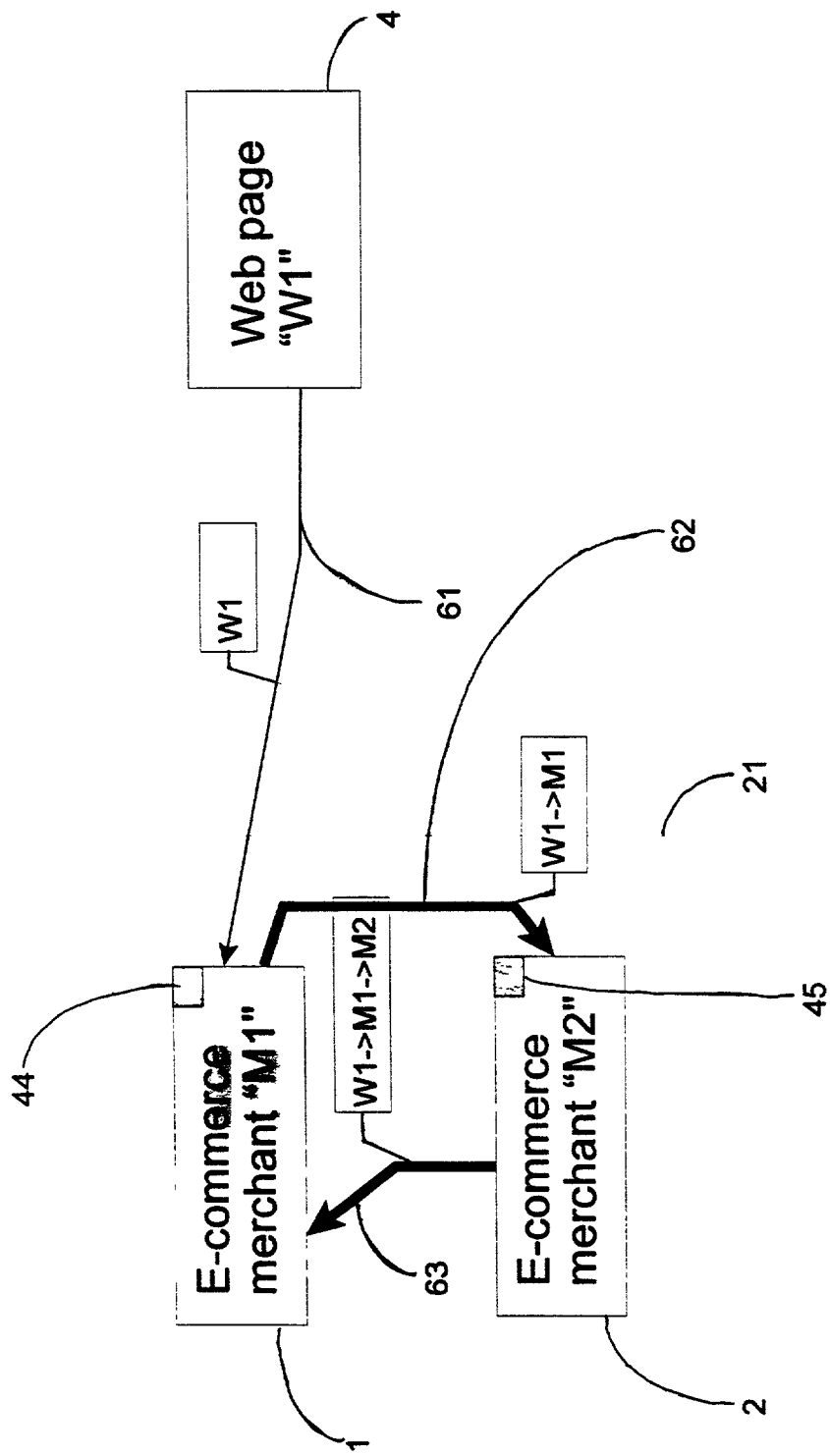
FIG. 6 depicts an exemplary network-based e-commerce environment in accordance the invention, wherein referral source information is embedded in navigation links.

Referring now to FIG. 6, web page 4, e-commerce merchant 1 and e-commerce merchant 2 are shown with associated id's, "W1," "M1" and "M2," respectively. Such id's may be advantageously employed, in association with the primary and secondary referral links, to identify and track referral sources. For example, FIG. 6 depicts: (i) embedding of source id "W1" in primary referral link 61 from web page 4 to merchant 1; (ii) embedding of referral source id's "W1→M1" in secondary referral link 62 from merchant 1 to merchant 2; and (iii) embedding of referral source id's "W1→M1→M2" in secondary referral link 63 from merchant 2 back to merchant 1. If, as a result of referral link 63, a transaction is completed at merchant 1, then merchant 1's stub software 44 can advantageously utilize link 63's referral tracking information ("W1→M1→M2") to determine that "M2" and "W1" may need to be compensated and, if so, in what amounts.

Figure 7:
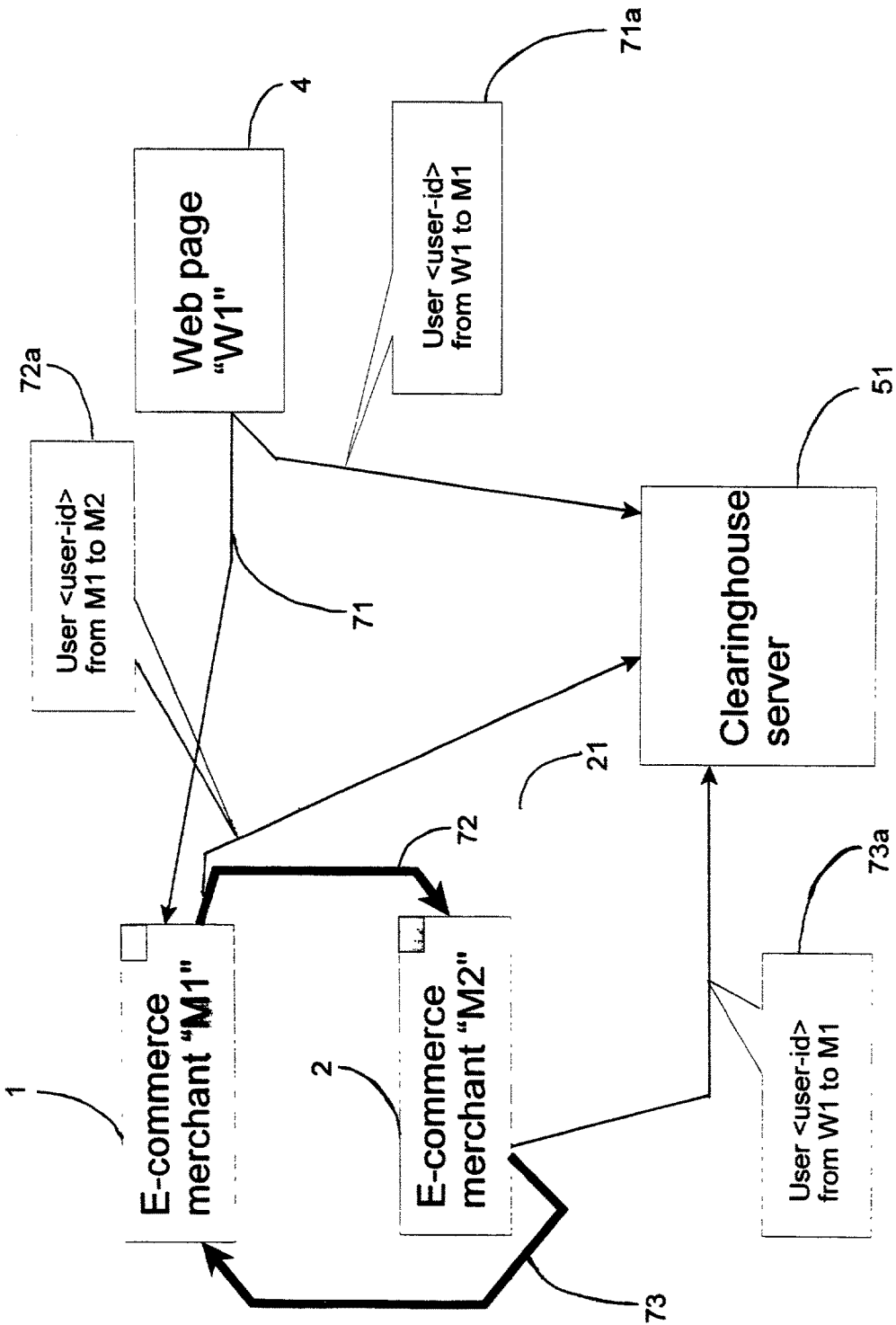
FIG. 7 depicts an exemplary network-based e-commerce environment in accordance the invention, wherein referral source information is sent to clearinghouse server though a network-based messaging mechanism; and, FIG. 8 depicts an exemplary network-based e-commerce environment in accordance the invention, wherein referral commissions are computed without use of a separate clearinghouse server.

Referring now to FIG. 7, another alternative referral tracking mechanism involves the transmission of referral tracking messages 71*a*, 72*a*, 73*a* to a clearinghouse server 51. Thus, for example, when a user engages primary referral link 71 to navigate from web page 4 to merchant 1, a message 71*a* is sent to clearinghouse server 51 confirming that said user has navigated from id "W1" to id "M1." Such messages may be sent by the referral source, destination, or appropriate system software. Upon a user's purchase of goods or services from merchant 1 in response to referral link 73, clearinghouse server 51 utilizes information received in messages 71*a*-73*a* to determine appropriate commission distributions between primary and secondary referral sources.

As an alternative, or a supplement, to the tracking mechanisms described above, referral history data can be stored in the user's computer, in the form of "cookies" or other data records, as is known in the art.

Figure 8:
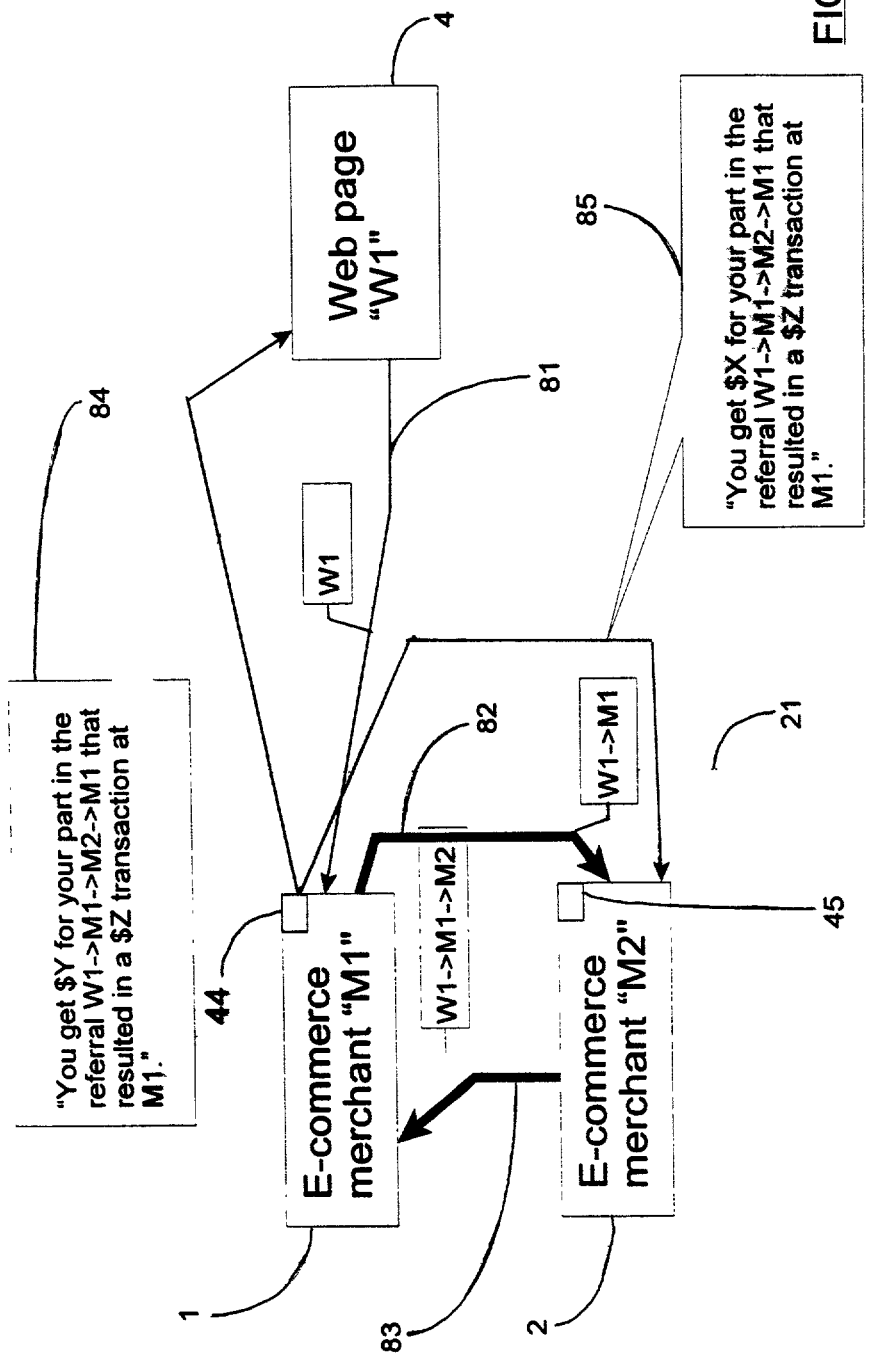

Referring now to FIG. 8, which depicts the case in which a primary referral 81, a secondary referral 82 and another secondary referral 83 results in a transaction at e-commerce merchant 1, merchant 1's stub software 44 illustratively generates and sends commission distribution messages 84 and 85 to referral sources 4 and 2, respectively, indicating the commission that such sources will earn for their part in generating merchant 1's transaction. Alternatively, the computation of commissions, and/or generation of messages 84 and 85, can be performed by a separate clearinghouse server, as previously described.

While the foregoing has described and exemplified aspects of various embodiments of the present invention, those skilled in the art will recognize that alternative elements and techniques, and/or combinations and sub-combinations of the described elements and techniques, can be substituted for, or added to, the embodiments and methods described herein. The present invention, therefore, should not be limited to, or defined by, the specific apparatus, methods, and articles-of-manufacture described herein, but rather by the appended claims, which are intended to be construed in accordance with well-settled principles of claim construction, including, but not limited to, the following:

Limitations should not be read from the specification or drawings into the claims (e.g., if the claim calls for a "chair," and the specification and drawings show a rocking chair, the claim term "chair" should not be limited to a rocking chair, but rather should be construed to cover any type of "chair").

The words "comprising," "including," and "having" are always open-ended, irrespective of whether they appear as the primary transitional phrase of a claim, or as a transitional phrase within an element or sub-element of the claim (e.g., the claim "a widget comprising: A; B; and C" would be infringed by a device containing 2A's, B, and 3C's; also, the claim "a gizmo comprising: A; B, including X, Y, and Z; and C, having P and Q" would be infringed by a device containing 3A's, 2X's, 3Y's, Z, 6P's, and Q).

The indefinite articles "a" or "an" mean "one or more"; where, instead, a purely singular meaning is intended, a phrase such as "one," "only one," or "a single," will appear.

Where the phrase "means for" precedes a data processing or manipulation "function," it is intended that the resulting means-plus-function element be construed to cover any, and all, computer implementation(s) of the recited "function" using any standard programming techniques known by, or available to, persons skilled in the computer programming arts.

A claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/software which implements the invention must, as a whole, implement at least the function(s) called for by the claims.

What is claimed is:

1. A data processing system for supporting web-based commerce and commission tracking on a multi-node network comprising:
   a clearinghouse server in communication with a network-accessible server that hosts a network-accessible webpage and a group of affiliated merchant servers including a first merchant server and a second merchant server, wherein
   the network-accessible webpage includes a primary referral link that directs a user from the network-accessible webpage to a first merchant webpage generated by the first merchant server;

the first merchant server generates the first merchant webpage including a first secondary referral link that directs the user to a second merchant webpage generated by the second merchant server, and the first merchant server includes a first stub software module;

the second merchant server generates the second merchant webpage including a second secondary referral link that directs the user to the first merchant webpage, and the second merchant server includes a second stub software module;

the first and second stub software modules are configured to assist in tracking of referrals and detecting commission-generating events;

said clearinghouse server receives a first message when a user engages the primary referral link, and the first message confirms completion of the user's navigation from the network-accessible webpage to the first merchant webpage;

said clearinghouse server receives a second message when the user engages the first secondary referral link, and the second message confirms completion of the user's navigation from the first merchant webpage to the second merchant webpage;

said clearinghouse server receives a third message when the user engages the second secondary referral link, and the third message confirms completion of the user's navigation from the second merchant webpage to the first merchant webpage;

said clearinghouse server contains programming for communicating with the first merchant server, wherein said clearinghouse server receives communications from the first merchant server, wherein said communications comprise information relating to completion of an electronic transaction by the user on the first merchant webpage;

said clearinghouse server assigns compensation to the network-accessible server and the second merchant server based on the first message, the second message and the third message in response to the user's completion of the electronic transaction with the first merchant webpage, and the clearinghouse server, the network-accessible server, and the first and second merchant servers comprise at least one of hardware and software embodied on a non-transitory computer readable medium and executable by a processor.

2. The data processing system of claim 1 wherein compensation assigned to the network-accessible server and the second merchant server comprise equal shares.

3. The data processing system of claim 1 wherein compensation assigned to the network-accessible server comprises a majority portion of a commission associated with said user's completion of the electronic transaction, and compensation assigned to the second merchant server comprises a minority portion of a commission associated with said user's completion of the electronic transaction.

4. The data processing system of claim 1 further comprising a database communicatively coupled to the clearinghouse server, the database operable to store data associated with the network-accessible server and the second merchant server.

5. The data processing system of claim 4 wherein the database is further operable to store data associated with compensation assigned to the network-accessible server and the second merchant server.

6. A method for supporting web-based commerce and commission tracking at a clearinghouse server, the clearinghouse server in communication with a network-accessible server that hosts a network-accessible webpage and a group of affiliated merchant servers including a first merchant server and a second merchant server, the method comprising:

receiving, by the clearinghouse server, a first message when a user engages a primary referral link provided on the network-accessible webpage that directs the user from the network-accessible webpage to a first merchant webpage hosted by the first merchant server, the first message confirming completion of the user's navigation from the network-accessible webpage to the first merchant webpage, the first merchant server including a first stub software module;

receiving, by the clearinghouse server, a second message when the user engages a first secondary referral link provided on the first merchant webpage that directs the user from the first merchant webpage to a second merchant webpage hosted by the second merchant server, the second message confirming completion of the user's navigation from the first merchant webpage to the second merchant webpage, the second merchant server including a second stub software module, the first and second stub software modules being configured to assist in tracking referrals and detecting commission-generating events;

receiving, by the clearinghouse server, a third message when the user engages a second secondary referral link provided on the second merchant webpage that directs the user from the second merchant webpage to the first merchant webpage hosted by the first merchant server, the third message confirming completion of the user's navigation from the second merchant webpage to the first merchant webpage;

receiving, by the clearinghouse server, an indication from the first merchant server when the user completes an electronic purchase via the first merchant webpage; and assigning, by the clearinghouse server, compensation to the network-accessible server and the second merchant server based on the first message, the second message and the third message in response to the received indication.

7. The method of claim 6, wherein assigning compensation comprises assigning compensation to the network-accessible server and the second merchant server in equal shares.

8. The method of claim 6, wherein assigning compensation to the network-accessible server comprises assigning a majority portion of a commission associated with said electronic purchase to the network accessible server, and assigning compensation to the second merchant server comprises assigning a minority portion of said commission to the second merchant server.

9. Software embodied on a non-transitory computer readable medium and executable by a processor of a clearinghouse server, the clearinghouse server in communication with a network-accessible server that hosts a network-accessible webpage and a group of affiliated merchant servers including a first merchant server and a second merchant server, wherein said software, when executed on a computer, causes said computer to perform steps comprising:

receiving, by the clearinghouse server, a first message when a user engages a primary referral link provided on the network-accessible webpage that directs the user from the network-accessible webpage to a first merchant webpage hosted by the first merchant server, the first message confirming completion of the user's navigation from the network-accessible webpage to the first merchant webpage, the first merchant server including a first stub software module;

receiving, by the clearinghouse server, a second message when the user engages a first secondary referral link provided on the first merchant webpage that directs the user from the first merchant webpage to a second merchant webpage hosted by the second merchant server, the second message confirming completion of the user's navigation from the first merchant webpage to the second merchant webpage, the second merchant server including a second stub software module, the first and second stub software modules being configured to assist in tracking referrals and detecting commission-generating events;

receiving, by the clearinghouse server, a third message when the user engages a second secondary referral link provided on the second merchant webpage that directs the user from the second merchant webpage to the first merchant webpage hosted by the first merchant server, the third message confirming completion of the user's navigation from the second merchant webpage to the first merchant webpage;

receiving, by the clearinghouse server, an indication from the first merchant server when the user completes an electronic purchase via the first merchant webpage; and assigning, by the clearinghouse server, compensation to the network-accessible server and the second merchant server based on the first message, the second message and the third message in response to the received indication.

10. Software embodied on a non-transitory computer readable medium and executable by a processor of claim 9, wherein assigning compensation comprises assigning compensation to the network-accessible server and the second merchant server in equal shares.

11. Software embodied on a non-transitory computer readable medium and executable by a processor of claim 9, wherein assigning compensation to the network-accessible server comprises assigning a majority portion of a commission associated with said electronic purchase to the network-accessible server, and assigning compensation to the second merchant server comprises assigning a minority portion of said commission to the second merchant server.

* * * * *